United States Patent [19]

Gomez

[11] 4,239,486
[45] Dec. 16, 1980

[54] THAWING ASSEMBLY FOR CLOGGED ASPHALT PIPES

[76] Inventor: Manuel D. Gomez, 935 E. Morning Star, Tempe, Ariz. 85283

[21] Appl. No.: 33,970

[22] Filed: Apr. 27, 1979

[51] Int. Cl.³ .............................................. F24J 3/00
[52] U.S. Cl. .................................... 432/225; 138/32; 237/80; 432/2; 432/10; 432/226
[58] Field of Search .................... 432/2, 10, 219, 225, 432/226; 237/80; 138/32, 147

[56] References Cited

U.S. PATENT DOCUMENTS

| 494,484 | 3/1893 | McRae | 432/225 |
|---|---|---|---|
| 778,016 | 12/1904 | Doran | 432/225 |
| 2,296,387 | 9/1942 | Inskeep et al. | 432/225 |
| 2,378,001 | 6/1945 | Drummond | 432/10 |
| 3,466,020 | 9/1969 | Blinne | 432/225 |
| 3,809,531 | 5/1974 | Jones | 432/225 |
| 3,957,032 | 5/1976 | Jelesko | 432/225 |

Primary Examiner—John J. Camby
Attorney, Agent, or Firm—Warren F. B. Lindsley

[57] ABSTRACT

A heat applying assembly for thawing out clogged asphalt containing pipes.

5 Claims, 7 Drawing Figures

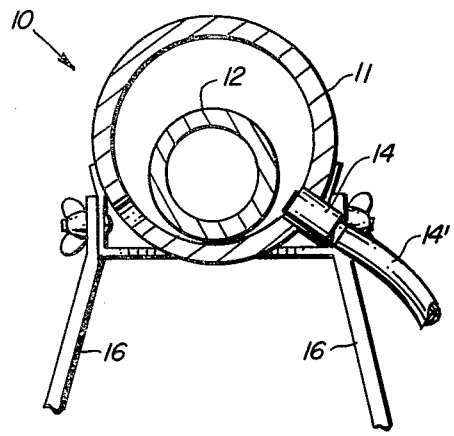
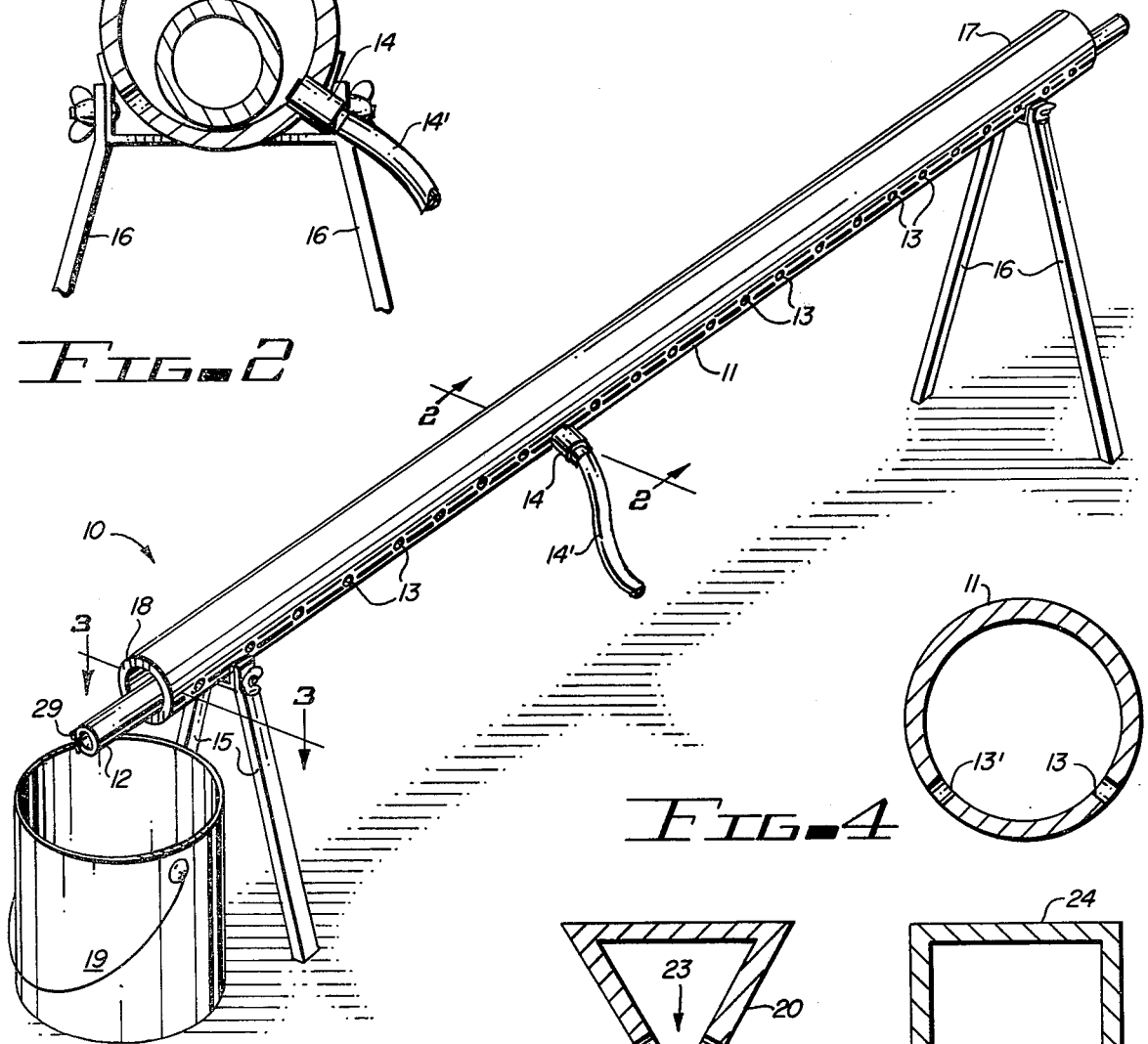
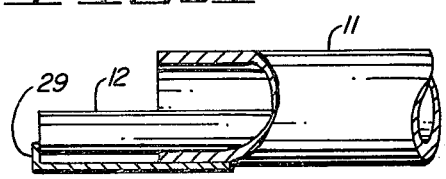
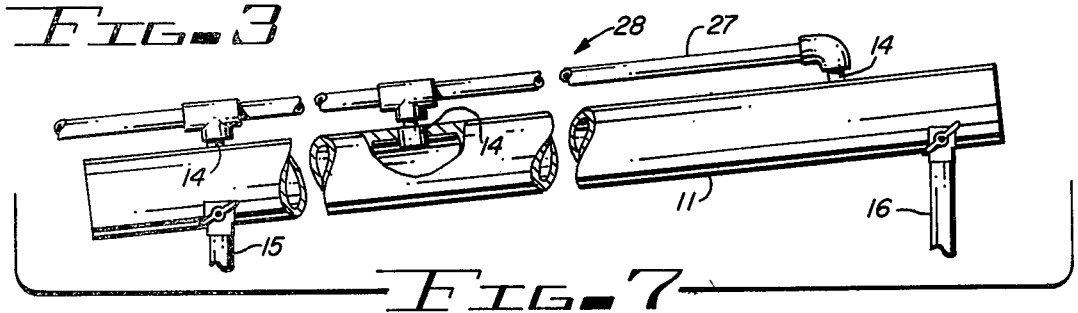

THAWING ASSEMBLY FOR CLOGGED ASPHALT PIPES

BACKGROUND OF THE INVENTION

This invention relates to a heat applying assembly for thawing out clogged pipes used in transporting liquid asphalt.

In the asphalt roofing business, it is necessary to pump liquid asphalt from a heating pot on the ground through a piping system to a hot asphalt container on an upper story or roof of a building being roofed. When the hot asphalt container on the roof is full, the remainder of the hot liquid asphalt in the piping system is drained back through the piping system to the heating pot on the ground. During this procedure, the asphalt may cool and harden in the piping system plugging it and making the piping system useless until the asphalt is thawed out and drained from the pipes.

PRIOR ART

Heretofore, the thawing out of asphalt pipes has been accomplished by merely building a fire under the pipe when placed on the ground with gas or other similar fuels creating a tremendous amount of smoke which is objectionable and in many places restricted for environmental reasons.

U.S. Pat. No. 3,206,179 discloses a plurality of burners mounted along the length of a pipe carrying molten metal to keep the system fluent. This patent discloses the use of heating elements spaced along its length with sections of insulation which are housed in a metal housing clamped over more than half of the circumference of the pipe. The housing comprises discrete members which are disposed in an end-to-end relationship along the length of the pipe.

U.S. Pat. No. 3,275,803 discloses a pipe heating apparatus including a tube which is slipped over the end of a pipe to be protected against freezing. The apparatus is electrically heated by an internally positioned heating wire wound in the form of an open helixal configuration. The cylindrical outline of the helix is chosen to be slightly larger than the outside diameter of the pipe to be surrounded.

While the prior art inventions do suggest workable approaches for their purposes, none of these prior art assemblies or devices are satisfactory for thawing out asphalt carrying pipes used in the roofing business.

SUMMARY OF THE INVENTION

In accordance with the invention claimed, an improved pipe thawing assembly, apparatus or device is provided for pipes of the piping system used in the asphalt roofing business.

It is, therefore, one object of this invention to provide an improved apparatus or device used for thawing out clogged portions of the liquid carrying asphalt lines used in transporting liquid asphalt from one point to another.

Another object of this invention is to provide a new and improved heating chamber for a section of pipe.

A further object of this invention is to provide an improved, compact assembly for heating, individually, sections of asphalt carrying pipe in which the asphalt has solidified.

Further objects and advantages of the invention will become apparent as the following description proceeds and the features of novelty which characterize the invention will be pointed out with particularity in the claims annexed to and forming a part of this specification.

BRIEF DESCRIPTION OF THE DRAWING

The present invention may be more readily described by reference to the accompanying drawing in which:

FIG. 1 is a perspective view of a heating assembly employing an encasing sleeve for the clogged pipe section and embodying the invention;

FIG. 2 is a cross-sectional view of FIG. 1 taken along the line 2—2 showing a single heating head;

FIG. 3 is a cross-sectional view of FIG. 1 taken along the line 3—3;

FIG. 4 is a cross-sectional view of the outer casing of the heater head shown in FIG. 1 illustrating two of the sequences of apertures spacedly arranged along the length of the casing;

FIG. 5 is a cross-sectional view of a modification of the outer heating casing shown in FIGS. 1–4;

FIG. 6 is a cross-sectional view of a further modification of the outer heating casing shown in FIGS. 1–5; and FIG. 7 is a modification of the heating assembly shown in FIG. 1 illustrating a manifold extending alongside and longitudinal of the outer heating casing and employing a plurality of spaced heating heads positioned to extend into the heating casing of the assembly.

DESCRIPTION OF THE PREFERRED EMBODIMENT

Referring nore particularly to the drawing by characters of reference, FIG. 1 diagrammatically illustrates a heating assembly 10 for thawing out clogged pipes, such as, for example, pipes used in hot asphalt conveying systems in the roofing business. In the asphalt roofing business, it is necessary to pump liquid asphalt from a heating pot (not shown) usually mounted on the ground to one or more stories above it to a hot liquid pot positioned in the area of the roof being treated. The remainder of the liquid asphalt not needed to fill the hot liquid pot on the roof drains back to the heating pot on the ground. During this procedure the asphalt may cool and harden in the piping, plugging it and making it useless until it is thawed out and drained from the pipe.

Accordingly, the heating assembly disclosed comprises an outer shell or casing 11 for at least partially surrounding the pipe or pipe section 12 to be thawed out. Casing 11 is provided with one or more rows of spacedly positioned apertures, openings or holes 13 extending along at least a part of its length for introducing air into the burning zone of the gas torch 14 and its fuel feeding line 14' attached to casing 11 and extending through an opening 13 into the interior of the casing.

FIG. 4 illustrates that casing 11 may have a second row of spaced holes 13' extending longitudinally along the length of pipe 11 to provide more air for the combustion of the fuel such as a suitable gas or mixture thereof used by torch 14.

Complete combustion of the gaseous fuel used by torch 14 is dependent upon the thorough mixing of the fuel gases not only during exit from the nozzle of the torch but during combustion of the gases as they penetrate the hollow interior of shell or casing 11. Thus, the row or rows of holes 13 along casing 11 provide suitable oxygen for complete combustion of the fuel gases along and around the pipe section 12 placing in casing 11 for thorough and more uniform heating along the pipe section.

As noted from the drawing, casing 11 forming the heating chamber is mounted on two spacedly positioned pairs of leg assemblies 15 and 16 in such a manner that a common end 17 of casing 11 is elevated a given distance above its other end 18. Thus, as pipe section 12 is heated along its length by the effects of the heating torch 14 the solidified asphalt therein again becomes fluid and flows out of it into a drainage pot 19. The pipe section 12 now being opened, i.e., unplugged, may again be connected into the asphalt conveying system as a useful part thereof.

FIG. 5 illustrates a modification of the casing 11 shown in FIGS. 1-4 wherein casing 20 comprises a V-shaped configuration having two rows of spaced air venting apertures or holes 21 and 22 arranged in the manner shown in casing 11 or in any other suitable grouping positions or arrangements. In this particular trough configuration, the pipe casing 11 would rest in the V-shaped configuration 23 formed by lower portion of the casing.

FIG. 6 discloses a further modification of the casings 11 and 20 shown in FIGS. 1 and 4 wherein the casing 24 comprises a rectangular configuration having a plurality of rows of spaced apertures 25 and 26 arranged in any suitable arrangement along a part or all of its length.

FIG. 7 discloses a still further modification of the structure or assembly shown in FIGS. 1-6 wherein a fuel manifold 27 is arranged to extend along at least a part of the length of casing 11 with more than one torch 14 extending therefrom each to or into one of apertures 13 or 13' of the heating assembly 28, which apertures may be randomly spaced along casing 11, if so desired.

By the use of the heating assembly 28 with its spaced grouping of heating heads or torches 14, heat may be more evenly applied along the length of the pipe section being thawed.

As shown in FIGS. 1 and 3, a clamp 29 may be attached to end 18 of casing 11 for gripping and holding the end of pipe section 12 and preventing it from sliding out of the casing during a thawing operation without interfering with the liquid asphalt flow therefrom.

Although but a few embodiments of this invention have been illustrated and described, it should be apparent to those skilled in the art that various changes and modifications may be made therein without departing from the spirit of the invention or from the scope of the appended claims.

What is claimed is:

1. A pipe section heating assembly comprising:
    an elongated hollow metallic casing having a plurality of apertures arranged along at least a part of its length for extending thereinto,
    a fuel consuming heating torch arranged to extend through at least one of said apertures for burning within said casing,
    a support assembly for holding said casing in an angular position with a supporting surface for said heating assembly so that one end of said casing is at an elevated position with respect to its other end,
    said casing being capable of supporting a pipe section therein along its length,
    whereby when said torch is ignited, the heat from the burning gases will heat the pipe section sufficiently to thaw matterial clogging its interior, and
    a clamp fastened to said other end of said casing longitudinally thereof and extending beyond its free end for grasping and holding the pipe section therein.

2. The pipe section heating assembly set forth in claim 1 wherein:
    said apertures are equally spaced from each other to form two rows of apertures along at least a part of the length of said casing.

3. The pipe section heating assembly set forth in claim 2 wherein:
    said casing comprises a circular cross-sectional configuration.

4. The pipe section heating assembly set forth in claim 2 wherein:
    said casing comprises a V-shaped cross-sectional configuration with said two rows of apertures being arranged one on each side of a common apex of said casing.

5. The pipe section heating assembly set forth in claim 2 wherein:
    said casing comprises a rectangular cross-sectional configuration with said two rows of apertures being arranged along different opposite sides of said casing.

* * * * *